US007209731B2

(12) United States Patent
Choi et al.

(10) Patent No.: US 7,209,731 B2
(45) Date of Patent: Apr. 24, 2007

(54) METHOD OF MEMBERSHIP PROTECTION USING MOBILE COMMUNICATION DEVICE

(75) Inventors: Yong-Hak Choi, 20-1407 Hyundae APT, 1436-1 Seocho 1-dong, Seocho-gu, 187-865, Seoul (KR); Jong-Sung Park, Seoul (KR); Se-Joong Oh, Seoul (KR)

(73) Assignee: Yong-Hak Choi, Seoul (KR)

( * ) Notice: Subject to any disclaimer, the term of this patent is extended or adjusted under 35 U.S.C. 154(b) by 47 days.

(21) Appl. No.: 10/505,426

(22) PCT Filed: Feb. 14, 2003

(86) PCT No.: PCT/KR03/00317

§ 371 (c)(1),
(2), (4) Date: Mar. 23, 2005

(87) PCT Pub. No.: WO03/073393

PCT Pub. Date: Sep. 4, 2003

(65) Prior Publication Data

US 2005/0170810 A1 Aug. 4, 2005

(30) Foreign Application Priority Data

Feb. 27, 2002 (KR) ..................... 10-2002-0010572

(51) Int. Cl.
*H04M 11/04* (2006.01)
*H04M 1/00* (2006.01)
*H04B 7/185* (2006.01)

(52) U.S. Cl. .............................. 455/404.2; 455/456.1; 455/404.1; 342/357.09

(58) Field of Classification Search ..... 455/456.1–457, 455/404.2, 404.1; 342/357.09
See application file for complete search history.

(56) References Cited

U.S. PATENT DOCUMENTS

| | | | | |
|---|---|---|---|---|
| 5,418,537 | A | 5/1995 | Bird | 342/357.04 |
| 6,011,967 | A * | 1/2000 | Wieck | 455/404.1 |
| 6,028,514 | A * | 2/2000 | Lemelson et al. | 340/539.13 |
| 6,317,049 | B1 | 11/2001 | Touboa et al. | 340/573.4 |
| 6,799,049 | B1 * | 9/2004 | Zellner et al. | 455/456.1 |
| 2004/0014478 | A1 * | 1/2004 | Hoffman et al. | 455/456.1 |

* cited by examiner

*Primary Examiner*—William Trost
*Assistant Examiner*—Ariel Balaoing
(74) *Attorney, Agent, or Firm*—Ked & Associates, LLP

(57) ABSTRACT

A member protection method using a mobile communication terminal is provided, and in particular a member protection method using a mobile communication terminal is provided which is capable of quickly coping with an emergency situation in such a manner that when a certain situation, for example, a member with a mobile communication terminal having a positioning function rides in taxi or is in a strange building, and moving information such as an engaged time when the situation is ended and a taxi registered number is registered in a central control server, a member's position is recognized and temporarily stored. In the case that a movement lifting notice is not received from a member until an engaged time, a certain moving information such as a member's position is transmitted to a mobile communication terminal of a security staff.

3 Claims, 3 Drawing Sheets

METHOD OF MEMBERSHIP PROTECTION USING MOBILE COMMUNICATION DEVICE

TECHNICAL FIELD

The present invention relates to a method of membership protection using mobile communication device, and in particular to a method of membership protection using mobile communication device which is capable of quickly coping with an emergency situation in such a manner that when a certain situation, for example, a member with a mobile communication terminal having a positioning function rides on a taxi or in a strange building, and moving information such as an engaged time when the situation is ended and a taxi registered number is registered in a central control server, a member's position is recognized and temporarily stored, and in the case that a movement lifting notice is not received from a member until is the engaged time, a certain moving information such as a member's position is transmitted to a mobile communication terminal of a security staff.

BACKGROUND ART

Recently, a mobile communication device such as a cellular phone is widely used. In addition, thereto, a technology for positioning a person having a cellular phone by using a mobile communication terminal is generalized.

In the case that a woman or old and feeble person gets on a taxi or enters into a certain strange building, the person may feel certain insecurity, but a proper security counteraction is not obtained. In this case, the person may have a gas gun, etc. However, the above method may not be a proper counteraction.

DISCLOSURE OF INVENTION

Accordingly, it is an object of the present invention which overcomes the problems encountered in the conventional art to provide a method of membership protection using mobile communication device which is capable of quickly coping with an emergency situation in such a manner that when a certain situation, for example, a member with a mobile communication terminal having a positioning function rides on a taxi or in a strange building, and a moving information such as an engaged time when the situation is ended and a taxi registered number is registered in a central control server, a member's position is recognized and temporarily stored, and in the case that a movement lifting notice is not received from a member until an engaged time, a certain moving information such as a member's position is transmitted to a mobile communication terminal of a security staff.

In order to achieve the above objects, there is provided a method of membership protection using mobile communication device, comprising a step for constructing central control server in which a transmission and receipt of an information is controlled, a step for constructing a member information database in which a member information database operates in cooperation with the central control server, and member information including a mobile communication terminal number and a dedicated contact place is stored by the member, a step for constructing a moving information database in which a moving information database operates in cooperation with the central control server, and a member's moving information is stored, and an engaged time is registered, a step for starting a protection state in which moving information including an engaged time is received from a member in accordance with a control of the central control server, the engaged time is registered in the moving information database, and a moving information is stored and is reported to the dedicated contact place, a step for storing a position in which the position of the mobile communication terminal is traced at a certain period in accordance with a control of the central control server until a protection state is completed after a protection state releasing report is received from the member after the protection state is started, and the traced information is stored in the moving information database, and a step for transmitting moving information in which the position information stored in the step for storing position and moving information are transmitted to a mobile communication terminal of a mobilizing staff in accordance with a control of the central control server when a protection state releasing report is not received until the engaged time.

In order to achieve the above objects, wherein said a step for transmitting moving information, a position data stored in the step for storing position and moving information are transmitted to a mobile communication terminal of a mobilizing staff in accordance with a control of the central control server when a mobilizing request report is received by the central control server from the dedicated contact place.

In order to achieve the above objects, wherein said a step for transmitting moving information further includes a step for transmitting moving information to the dedicated contact place.

In order to achieve the above objects, wherein said mobile communication terminal is a cellular phone or a PDA (Personal Digital Assistant).

BRIEF DESCRIPTION OF THE DRAWINGS

The present invention will become better understood with reference to the accompanying drawings which are given only by way of illustration and thus are not limitative of the present invention, wherein.

DESCRIPTIONS OF REFERENCE NUMERALS OF MAJOR ELEMENTS OF THE DRAWINGS

10: member's mobile communication terminal

20: mobile communication system of mobile communication service provider

30: central control server

31: member information database

32: moving information database

40: mobile communication terminal of mobilizing staff

PREFERRED EMBODIMENT

Preferred embodiment of the Invention will be described with reference to the accompanying drawings.

Figure 1:
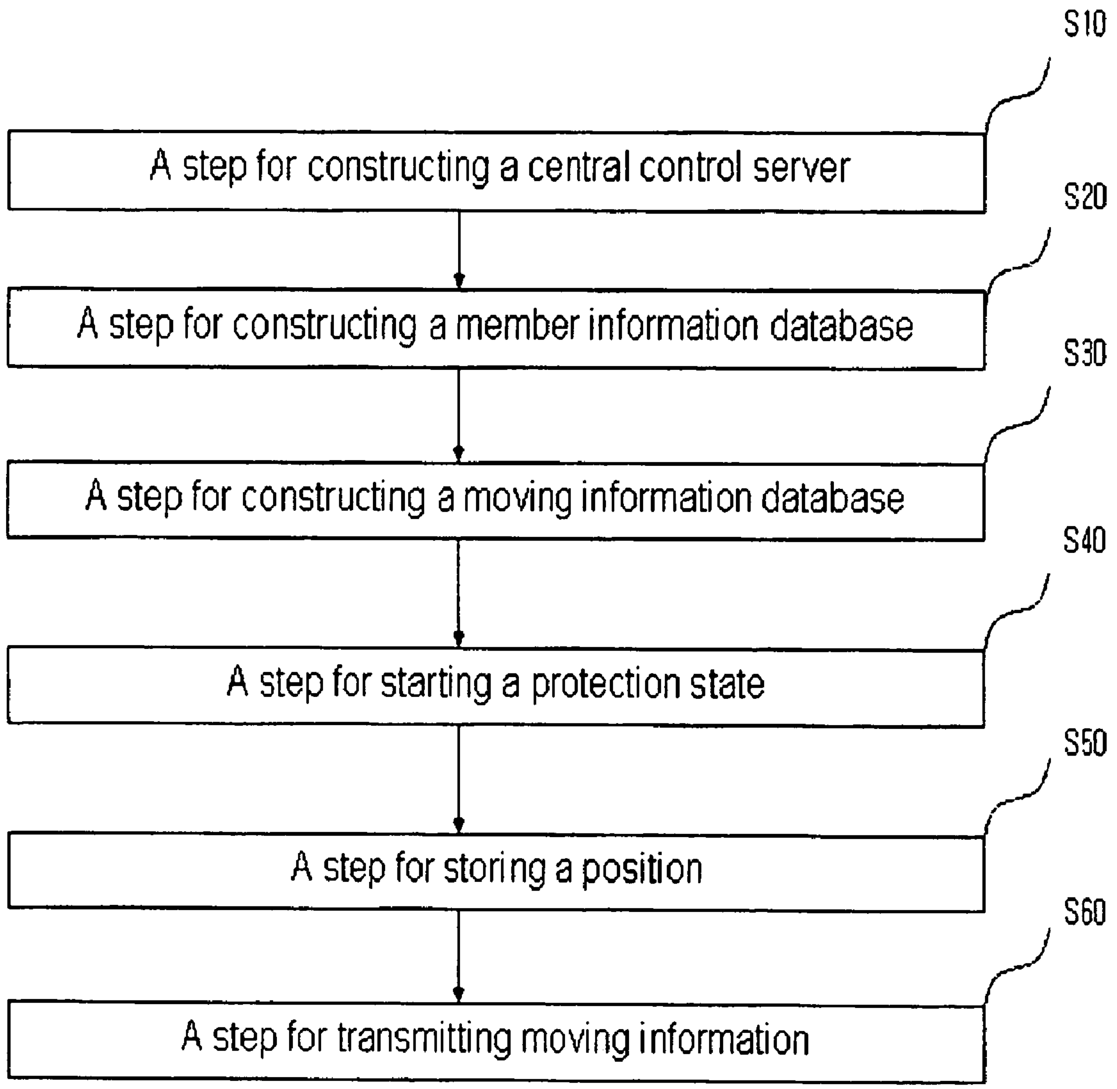
FIG. 1 is a diagram illustrating the construction of a member protection method using a mobile communication terminal according to the present invention.
Figure 2:
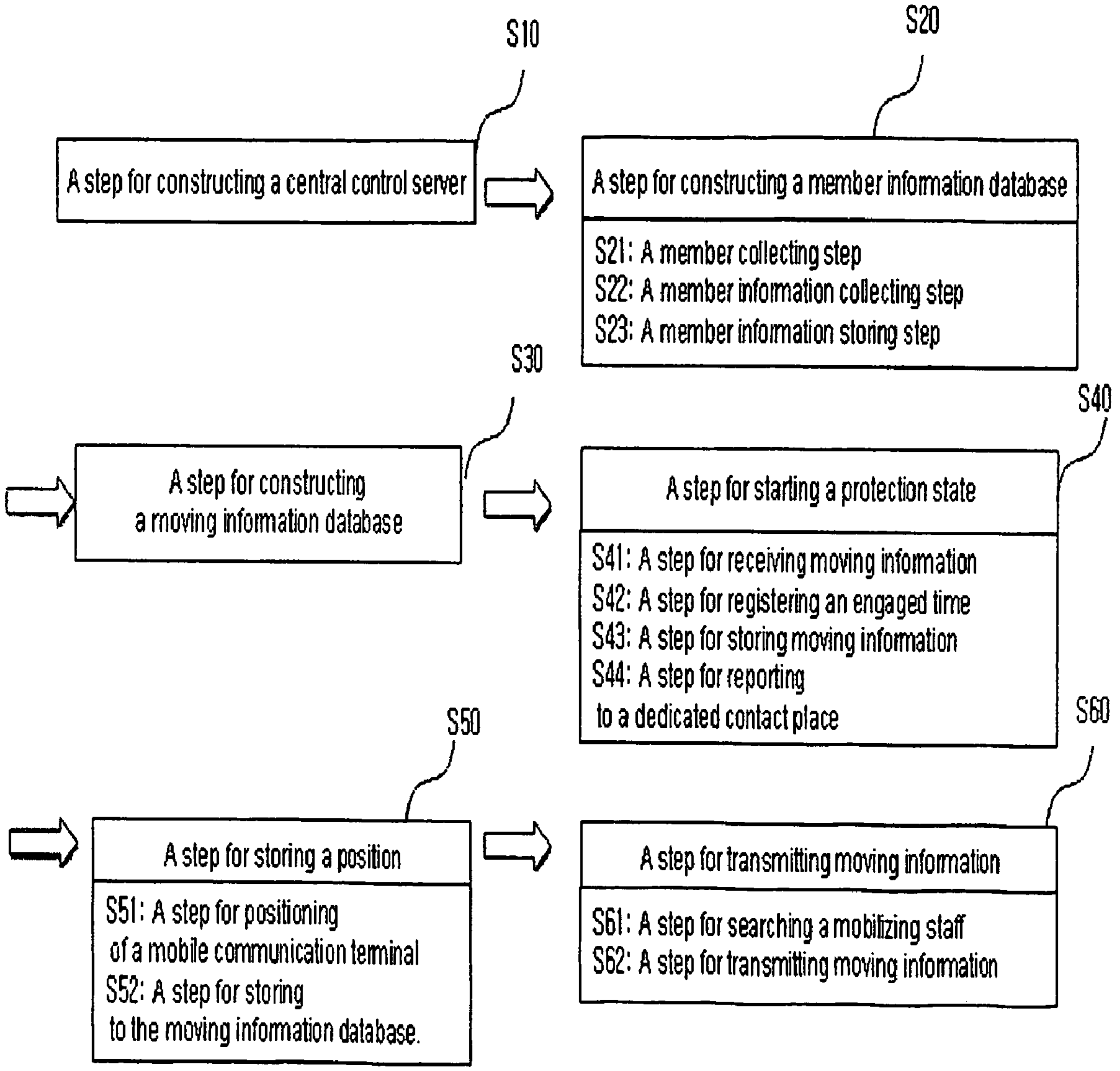
FIG. 2 is a diagram illustrating a detailed construction of FIG. 1.
Figure 3:
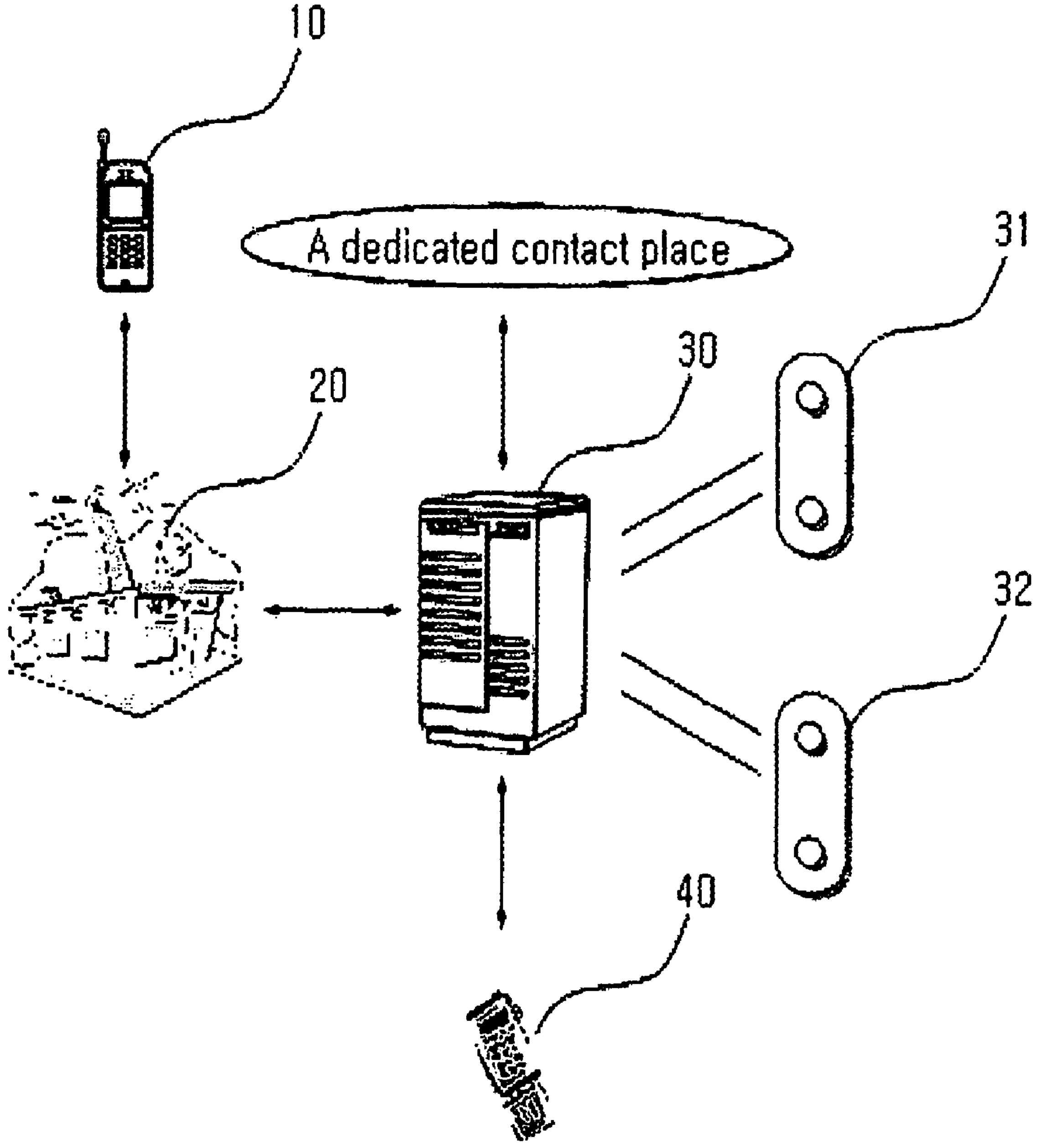
FIG. 3 is a diagram for describing a system for implementing a member protection method using a mobile communication terminal according to the present invention.

FIG. 1 is a diagram illustrating the construction of a member protection method using a mobile communication terminal according to the present invention, FIG. 2 is a diagram illustrating a detailed construction of FIG. 1, and FIG. 3 is a diagram for describing a system for implementing a member protection method using a mobile communication terminal according to the present invention.

First, as shown in FIG. 3, the system for implementing a member protection method using a mobile communication terminal according to the present invention will be described.

The above system includes a member's mobile communication terminal, a mobile communication system (20) of a mobile communication service provider, a central control server (30), a member information database (31), a moving information database (32) and a mobile communication terminal (40) of a mobilizing staff.

Here, the mobile communication terminal (10) represents a communication terminal which is capable of implementing an audio or data communication in a moving state, for example a cellular phone, a PDA (Personal Digital Assistant), etc. In a preferred embodiment of the present invention, a cellular phone is used for the mobile communication terminal (10). In addition, the mobile communication terminal (10) is constituted in such a manner that the mobile communication terminal (10) is capable of implementing a positioning function. The positioning information is transferred to the central control server (30) through the mobile communication system (20) of the mobile communication service provider.

The positioning method using the mobile communication terminal (10) is capable of implementing an accurate positioning function by using a mobile communication terminal in which a GPS (Global Positioning System) is installed and an A-GPS (Assisted GPS), a D-GPS (Differential-GPS), etc may be used. In addition, there are a network-based method, a dedicated network-based method, etc. In addition, it is possible to implement an accurate positioning function based on a hybrid method combined with an AOA (Angle of Arrival) method in which an angle of arrival of a signal coming from a mobile communication terminal is measured for thereby positioning a mobile communication terminal and a TOA (Time of Arrival) method which uses an incoming time of a radio wave.

Said the central control server (30) is a computer system, which is connected with a wired Internet, and wireless Internet for thereby controlling a transmission and receiving operation of information (data).

Said the wired Internet is directed to transmitting and receiving information based on HTTP (Hypertext Transfer Protocol) used for communicating a hypertext date on the Internet.

Said the wireless Internet transmits and receives an information based on a WAP (Wireless Application Protocol) which is directed to standardizing a method by which a mobile communication terminal such as a cellular terminal, a PDA, etc. is used for an Internet connection of an e-mail, audio and video transmission, etc.

Said the member information database (31) and the moving information database (32) operate in cooperation with the central control server (30) and include an information storing apparatus capable of writing and reading a stored information.

Said the mobile communication terminal of the mobilizing staff (40) is a terminal capable of implementing a wireless communication capable of receiving an information from the central control server (30) and includes a cellular phone, a PDA, etc.

The method of membership protection using mobile communication device to the present invention will be described with reference to FIG. 1 or FIG. 2.

As shown in FIG. 1, The a method of membership protection using mobile communication device according to the present invention includes a step for constructing central control server (S10), a step for constructing a member information database (S20), a step for constructing a moving information database (S30), a step for starting a protection state (S40), a step for storing a position (S50) and a step for transmitting moving information (S60).

In the step for constructing central control server (S10), a central control server (30), which is a computer system capable of controlling the whole processes, is constructed.

Said step for constructing a member information database (S20) includes a step for collecting a member (S21), a step for collecting member information (S22), and a step for storing member information (S23).

Said step for collecting a member (S21) collects a member online by forming a web site based on the central control server (30) and by a method such as a telephone call, home or office visit, etc.

In the step for collecting member information (S22), member information such as a name, photo, address, dedicated contact information, cellular phone number, etc. of a member, who is collected as a member in the step for collecting a member (S21), is collected. Said member information is collected online through the web site. In addition, it is possible to collect member information through a telephone call or post. The collected member information is stored in the member information database (31) by the member in the step for storing member information (S23) for thereby constructing the member information database (31). The member information database (31) controls the transmission and receiving operation (input and output) of the information in cooperation with the central control server (30).

In the step for constructing a moving information database (S30), the moving information database (32) is constructed for storing information concerning a member's movement such as an estimated end time which is an engaged time of a movement, a taxi license plate number, a name and position of a building, a member's position, etc. when a member gets on a taxi or enters into a certain building. The moving information database (32) controls a transmission and receiving operation (input and output) of an information in cooperation with the central control server (30) and operates as a post office box capable of recording a member's moving state.

Said step for starting a protection state (S40) includes a step for receiving moving information (S41), a step for registering an engaged time (S42), a step for storing moving information (S43), and a step for reporting for reporting to a dedicated contact place (S44).

In the step for receiving moving information (S41), in the case that a woman, kid, or old or feeble person, etc. gets on a taxi or is moved to a strange place in which a danger may occur, when information concerning the movement such as an engaged time that the movement is ended, a taxi license plate number, a moving place, etc. is transmitted through the mobile communication terminal (110) carried by the person, the central control server (30) receives the above information.

Said step for registering an engaged time (S42) and the step for storing moving information (S43) register an engaged time which is a moving end estimated time in the moving information database 32 and stores the moving information therein in accordance with a control of the central control server (30) when member's moving information is received in the step for receiving moving information (S41).

In addition, when the moving information is received, the central control server (30) searches a dedicated contact information from the member information database (31) and performs a step for reporting (S44) to the dedicated contact place for reporting a member's moving information through a SMS (Short Message Service) or e-mail.

The step for storing a position (S50) includes a step for positioning of a mobile communication terminal (S51), and a step for storing to the moving information database (S52).

When a protection state is started when a moving information is received from the member in the step for starting a protection state (S40), the position of the mobile communication terminal (10) carried by the member is traced at a certain period, and the positioning information of the mobile communication terminal is received by the central control server (30) through the mobile communication system of the mobile communication service provider (20). The central control server (30) stores the received position of the member in the moving information database (S52).

Said step for transmitting moving information (S60) includes a step for searching a mobilizing staff (S61) and a step for transmitting moving information (S62).

In a state that the member protection state is started when a certain moving information is received by the central control server (30) from the member in the step for starting a protection state (S40), if a report of moving releasing state is not received by the central control server (30) from the member until a certain engaged time or if a mobilizing request is received by the central control server (30) from the dedicated contact place, said step for transmitting moving information (S60) is performed, so that a direct protection counteraction is performed with respect to a member's danger.

Said mobilizing staff is a person who protects the member by mobilizing to a place where the member has a certain possible danger and includes a mobile communication terminal (40) which is capable of receiving the information concerning a member and moving information and position information of a member from the central control server (30). A certain number of mobilizing staff is allocated to a certain region for thereby effectively controlling the regions.

In the step for searching a mobilizing staff (S61), in the case that a certain member is judged to be in a certain danger, namely, an engaged time is passed in a state that a moving state end report is not received by the central control server (30) from the member until the engaged time, or in the case that a mobilizing request is received by the central control server (30) from a dedicated contact place, the mobilizing staff who is capable of most quickly mobilizing is searched based on the position of the member stored in the step for storing a position (S50).

In the step for transmitting moving information (S62), a member's information, moving information, position information, etc. is transmitted to the mobile communication terminal of the mobilizing staff (40) searched in the step for searching a mobilizing staff (S61) in accordance with a control of the central control server (30). Therefore, the mobilizing member who received certain mobilizing information mobilizes to a predicted position of the member for thereby protecting the member from the danger.

In addition, said moving information, etc, are concurrently transmitted to the dedicated contact place so that a protector of the person who is in the danger, effectively counteracts.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

INDUSTRIAL APPLICABILITY

As described above, when a woman, old or feeble person gets on a taxi or is moved to a danger place, the person registers an engaged time which represents his moving circumference and estimated moving end time using his mobile communication terminal for thereby previously preventing a certain danger and quickly measuring a certain danger state.

In addition, in the present invention, it is possible to more quickly position a member's position in combination with the moving information, which is previously received from a member and a conventional positioning technology.

Furthermore, it is possible to implement a dynamic counteraction based on a pass of an engaged time and a mobilizing request from a dedicated contact place even in a state that it is difficult to perform an emergency rescue.

What is claimed is:

1. A method of membership protection using a terminal location track system, the terminal location track system including a mobile communication terminal, a location of which is tracked, a mobile communication system of a mobile communication enterprise, a member information database for storing member information, a moving information database for storing a member's location information, and a central control server for controlling transmission and receipt of data, the method comprising:

constructing the member information database, which operates in cooperation with the central control server, and in which the member information including a mobile communication terminal number and a dedicated contact place are stored by the member;

constructing the moving information database, which operates in cooperation with the central control server, and in which the member's moving information is stored, and an engaged time is registered;

starting a protection state in which the member's moving information including the engaged time is received from a member in accordance with a control of the central control server, an engaged time is registered in the moving information database, and the member's moving information is stored and is reported to the dedicated contact place;

storing a position of the mobile communication terminal traced at a certain period in accordance with a control of the central control server until a protection state is completed after the report of releasing a protection state is received from the member after the protection state is started, wherein the traced information is stored in the moving information database; and transmitting moving information in which the position information stored in the storing the position step and moving information are transmitted to the dedicated contact place and a mobile communication terminal of a mobilizing staff in accordance with a control of the central control server when the report of releasing a protection state is not received until the engaged time.

2. The method of claim 1, wherein in the transmitting moving information step, a position data stored in the storing the position step and the moving information are transmitted to a mobile communication terminal of a mobilizing staff in accordance with a control of the central control server when a mobilizing request report is received by the central control server from the dedicated contact place.

3. The method of claim 1, wherein said mobile communication terminal is a cellular phone or a PDA (Personal Digital Assistant).

* * * * *